UNITED STATES PATENT OFFICE.

WILLIAM H. ROSS, OF WASHINGTON, DISTRICT OF COLUMBIA.

PROCESS FOR THE REMOVAL OF HYDROFLUORIC ACID FROM PHOSPHORIC ACID.

1,329,273.      Specification of Letters Patent.     Patented Jan. 27, 1920.

No Drawing.     Application filed July 26, 1919. Serial No. 313,845.

(FILED UNDER THE ACT OF MARCH 3, 1883, 22 STAT. L., 625.)

*To all whom it may concern:*

Be it known that I, WILLIAM H. ROSS, a citizen of the United States of America, and an employee of the Department of Agriculture of the said United States, residing at Washington, District of Columbia, (whose post-office address is Washington, District of Columbia,) have invented a new and useful Process for the Removal of Hydrofluoric Acid from Phosphoric Acid.

This application is made under the Act of March 3, 1883, chapter 143 (22 Stat. 625), and the invention herein described and claimed may be used by the Government of the United States, or any of its officers or employees, in the prosecution of work for the Government, and by any person in the United States without payment to me of any royalty thereon.

This invention relates to a simple and economical method for the elimination of hydrofluoric acid occurring in commercial phosphoric acid by a process of chemical precipitation.

The two sources of commercial phosphoric acid are charred bones and phosphate rock. Two methods known as the sulfuric acid and volatilization methods are also in use for preparing phosphoric acid from these raw materials.

In the sulfuric acid method the phosphatic material is treated with a sufficient quantity of sulfuric acid to set free the phosphoric acid which is then filtered off, purified and concentrated to such a degree as the industry for which it is intended may demand.

In the volatilization method phosphate rock is smelted in an electric furnace with a mixture of sand and coke and at such a temperature that the phosphorus is evolved either in the elementary state or as the oxid, depending upon whether or not air is admitted to the furnace. If the phosphorus is evolved as the oxid this may be most efficiently and economically recovered by means of a Cottrell precipitator as described in U. S. Patent No. 1,283,398, October 29, 1918. As the oxid fumes pass from the furnace in the process of smelting they react with the moisture of the air met with in their passage to the Cottrell system and are preciptated in the form of a solution of phosphoric acid. By keeping the temperature of the gases above 100° C., as they pass through the precipitator, acid may be recovered of such concentration that it will crystallize to a solid mass on cooling.

When phosphoric acid is prepared from phosphate rock by the sulfuric acid method, it will be found to contain greater or less amounts of all the constituents occurring in the raw materials used. Many of the impurities occurring in the acid prepared in this way can only be removed with difficulty and for this reason, when high grade acid is required, it is usually prepared by the oxidation of elementary phosphorus with hydration of the resulting product.

When phosphoric acid is prepared by the volatilization method, on the other hand, the only constituents of the raw materials which will pass over with the acid, apart from the small amount of material that may be carried over mechanically, are those which are volatilized at the temperature of the furnace. Even these will be eliminated in a large measure for most of the volatilized impurities, *e. g.*, sulfur dioxid, pass through the precipitator in the form of a gas and only such a portion is recovered as is represented by the partial or at most complete solubility of the gas in the phosphoric acid at the temperature at which precipitation takes place. For these various reasons, the amount of impurity in phosphoric acid prepared by the volatilization method is much less than in that prepared by the sulfuric acid method.

Of the impurities which do occur in the phosphoric acid prepared by the volatilization method by far the most objectionable is hydrofluoric acid. This comes from the fluorids occurring in the phosphate rock and owing to its solubility in the phosphoric acid is precipitated along with the latter in greater or less proportion, according to the temperature at which precipitation takes place.

If a phosphate rock containing the equivalent of say 40 per cent. of phosphoric acid also contained an average content of say three per cent. of fluorin and if the same proportion of each were evolved and recovered in the process of smelting, or in any other process of treating phosphate rock, there would thus be obtained an acid product containing over seven per cent. of hydrofluoric acid. The phosphoric acid actually recovered, however, either by the volatilization or sulfuric acid methods, always contains a lower percentage than this, as a part of the hydrofluoric acid escapes as a gas during either method of manufacture, but in spite of this the quantity occurring in phosphoric acid as commercially prepared is always, or usually, sufficient to make it undesirable for use in baking powder or other materials required in the manufacture of foodstuffs.

The object of my invention is to provide a simple and economical means of bringing about such a separation of the hydrofluoric from the phosphoric acid as will render the latter suitable for use in the manufacture of foodstuffs or other products where the presence of fluorin would be objectionable.

Since hydrofluoric acid is a gas, it should be possible to bring about its separation from phosphoric acid by heating the acid solution and blowing air through it. It was found that when the acid was heated to a temperature of 200° C. complete removal of the hydrofluoric acid could be brought about in this way in the course of several hours. At this temperature, however, phosphoric acid acts on most substances and a suitable container that will withstand the action of the acid is therefore difficult to secure.

As a means of obviating this difficulty, I have found that a complete separation of hydrofluoric acid from phosphoric acid may be brought about at ordinary temperature by use of a suitable precipitating agent. The agent usually recommended for the quantitative precipitation of fluorin is a salt of calcium as calcium chlorid. The solubility of calcium fluori in water amounts to one part in 62000 while sodium fluorid under the same conditions has a solubility of 2580 parts in the same volume of liquid. I have found, however, that in concentrated phosphoric acid solution the relative solubility of the respective fluorids are reversed and that the alkali fluorids are much more insoluble than the calcium fluorid. When the proper quantity of a sodium salt is therefore added to a concentrated solution of phosphoric acid containing hydrofluoric acid, a quantitative precipitation of the fluorin takes place. The precipitated sodium fluorid settles out rapidly and by decanting off the supernatant acid a quantitative separation of the fluorin from the phosphoric acid is secured. Contamination of the phosphoric acid with the acid radical of the sodium salt used may be avoided by using such sodium compounds as the phosphate, carbonate or hydroxid.

As the dilution of the phosphoric acid is increased, the efficiency of calcium and sodium salts for the removal of the fluorin more nearly approach each other and when the acid is very dilute the use of a calcium salt may be more effective than a compound of sodium. With acid of moderate concentration, it has been found advantageous to use a mixture of both calcium and sodium salts rather than either alone.

Having thus described my process, I claim:

1. A process for the removal of hydrofluoric acid from concentrated phosphoric acid which consists in precipitating the fluorin by adding to the phosphoric acid calcium chlorid equivalent to the fluorin present.

2. A process for the removal of hydrofluoric acid from concentrated phosphoric acid which consists in precipitating the fluorin by adding to the phosphoric acid a solution of sodium phosphate equivalent to the fluorin present.

WILLIAM H. ROSS.